United States Patent [19]

Few

[11] Patent Number: 5,743,357

[45] Date of Patent: Apr. 28, 1998

[54] AUTOMATIC HAND HELD TRANSMISSION FLUID CHARGER

[75] Inventor: Jeffrey P. Few, Elkhart, Ind.

[73] Assignee: Flo-Dynamics, Inc., Compton, Calif.

[21] Appl. No.: 544,644

[22] Filed: Oct. 18, 1995

Related U.S. Application Data

[63] Continuation-in-part of Ser. No. 403,180, Mar. 13, 1995, Pat. No. 5,535,849.

[51] Int. Cl.$^6$ ........................................................ F16C 3/14
[52] U.S. Cl. ........................................... 184/1.5; 141/98
[58] Field of Search ............................ 184/1.5; 141/98; 123/196 R

[56] References Cited

U.S. PATENT DOCUMENTS

| | | |
|---|---|---|
| 1,655,939 | 1/1928 | Copeland . |
| 1,815,221 | 7/1931 | Sweetland . |
| 1,829,173 | 10/1931 | Wertz . |
| 1,884,820 | 10/1932 | Osborne . |
| 2,320,048 | 5/1943 | Parson . |
| 2,499,705 | 3/1950 | Vokes . |
| 3,140,756 | 7/1964 | Dinkelkamp . |
| 3,216,527 | 11/1965 | Lewis . |
| 3,447,636 | 6/1969 | Bonfilo . |
| 3,513,941 | 5/1970 | Becnel . |
| 3,720,287 | 3/1973 | Martel . |
| 3,867,999 | 2/1975 | Cox . |
| 4,095,672 | 6/1978 | Senese . |
| 4,095,673 | 6/1978 | Takeuchi . |
| 4,128,140 | 12/1978 | Riches . |
| 4,331,185 | 5/1982 | Rinaldo et al. . |
| 4,674,456 | 6/1987 | Merritt . |
| 4,745,989 | 5/1988 | DiMatteo . |
| 4,807,674 | 2/1989 | Sweet . |
| 4,869,346 | 9/1989 | Nelson . |
| 4,938,315 | 7/1990 | Ohta et al. . |
| 4,951,784 | 8/1990 | Bedi . |
| 5,056,621 | 10/1991 | Trevino . |
| 5,062,398 | 11/1991 | Bedi et al. . |
| 5,062,500 | 11/1991 | Miller et al. . |
| 5,090,458 | 2/1992 | Creeron . |
| 5,092,429 | 3/1992 | Linares et al. . |
| 5,148,785 | 9/1992 | Sendak . |
| 5,289,837 | 3/1994 | Betancourt . |
| 5,291,968 | 3/1994 | Brown . |
| 5,318,080 | 6/1994 | Viken . |
| 5,318,700 | 6/1994 | Dixon et al. . |
| 5,337,708 | 8/1994 | Chen . |
| 5,370,160 | 12/1994 | Parker . |
| 5,372,219 | 12/1994 | Peralta .................................. 184/1.5 |
| 5,390,762 | 2/1995 | Nelson . |
| 5,427,202 | 6/1995 | Behring et al. . |
| 5,447,184 | 9/1995 | Betancourt . |
| 5,472,064 | 12/1995 | Vicken ................................... 184/1.5 |

FOREIGN PATENT DOCUMENTS

| | | |
|---|---|---|
| 2-72299 | 3/1990 | Japan . |
| 4-15354 | 5/1990 | Japan . |

OTHER PUBLICATIONS

Ex. F: document intended to promote Orbis ATF Changer.
Ex. G: document relating to Tatsuno ATF Changer.

(List continued on next page.)

*Primary Examiner*—Thomas E. Denion
*Attorney, Agent, or Firm*—Fulwider Patton Lee & Utecht, LLP

[57] ABSTRACT

An automatic hand held transmission fluid changer includes a compact housing internally plumbed with a pair of open ended drain and supply tubes for connection at respective first ends with a pair of hoses connected at their respective opposite ends to remote waste and unused fluid tanks. The respective tubes include second ends for connection with a second pair of hoses leading to respective upstream and downstream transmission components for, respectively, withdrawing used fluid from and introducing unused fluid to a transmission. A demand pump is connected in fluid circuit with the supply hose to flow unused fluid from the unused fluid tank to the supply tube. A controller is provided and acts to receive an electric signal proportional to the rate of fluid flow from a flow meter in the drain tube and to manipulate a control valve in the supply tube such that an automatic balancing of flow rates is achieved.

7 Claims, 5 Drawing Sheets

OTHER PUBLICATIONS

Ex. H: documents from Yamada Corporation relating to various apparatus.

Ex. I: brochure from Engine Solutions.

Ex. J: brochure for an Automatic Transmission Changer from Lih Yann Corporation, printed in Chinese, as well as various other documents printed in foreign languages, and what purports to be English translation thereof.

Ex. K: instructions utilized by employees of Grese Monkey of Denver, Colorado.

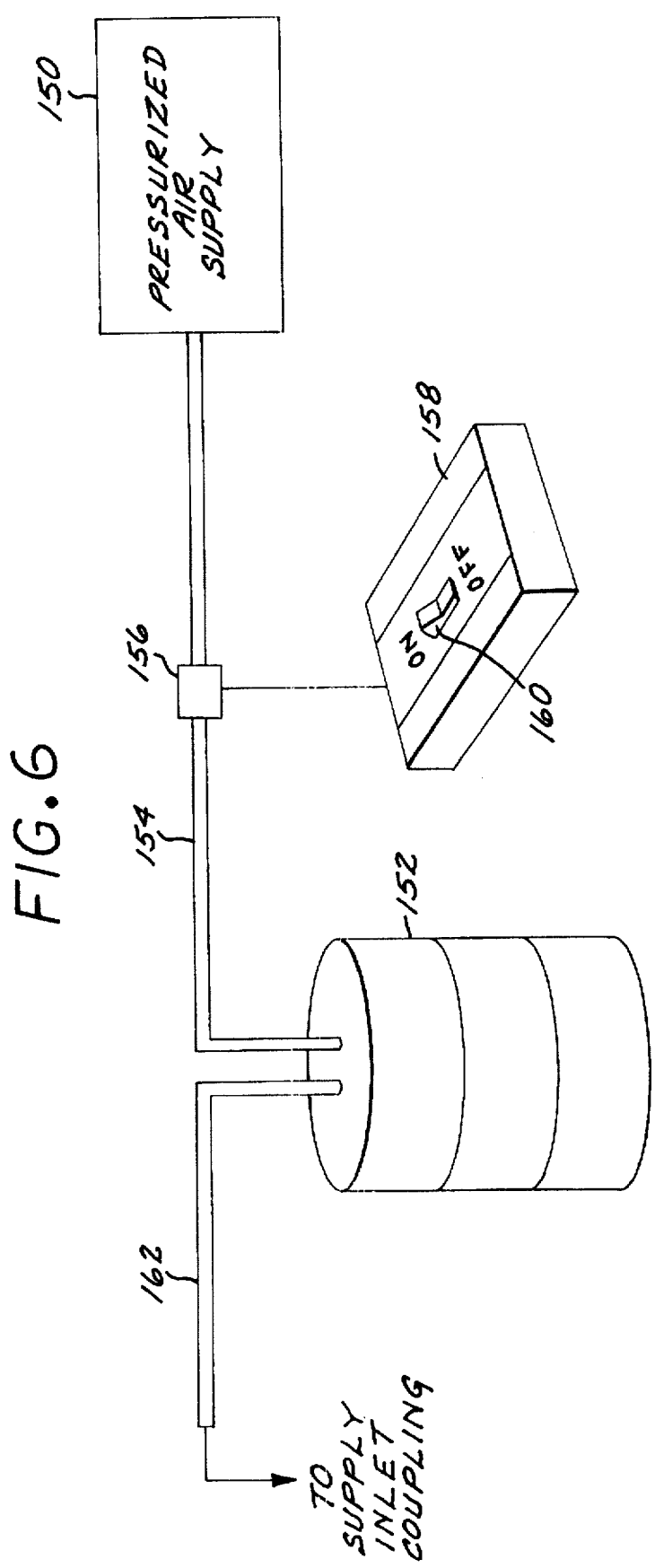

5,743,357

AUTOMATIC HAND HELD TRANSMISSION FLUID CHARGER

This application is a continuation-in-part of my application Ser. No. 08/403,180, filed Mar. 13, 1995, and now U.S. Pat. No. 5,535,849.

BACKGROUND OF THE INVENTION

1. Field of the Invention

The present invention relates to fluid exchanging apparatus and, more particularly, to an automatic, hand held control device for performing a simultaneous exchange of transmission fluid in an automatic transmission.

2. Description of the Prior Art

Automatic transmissions require transmission fluid because such fluid is employed in part as a driving means within the transmission and is additionally employed to lubricate the internal components within such transmissions. Over time such fluid becomes less viscous and thus less efficient in lubricating such components. It is therefore desirable to periodically perform an exchange of fluid to maintain the viscosity of such fluid within the transmission and to maintain the cleanliness of the transmission to thereby increase the useful life of the transmission. A complete exchange of fluid is preferred so that the used fluid as well as undesirable foreign matter contained therein is completely removed from the transmission and is replaced with new, more viscous fluid.

There has been a long standing need for a device which may efficiently perform a simultaneous, substantially complete exchange of transmission fluid in an automatic transmission while at the same time posing minimum risk of damage to the transmission. The conventional method, still widely practiced today, is to simply replace the fluid housed in the pan of the transmission. The pan typically holds from 1 to 5 quarts of the total 7 to 15 quart capacity of the transmission. Thus emptying the pan and then adding that amount of new fluid only serves to dilute the used fluid with some 15–25% of new fluid. Hence this conventional service is quite inefficient since it only serves to mix new fluid with a large quantity of used fluid. Furthermore, this service requires the removal of the transmission fluid pan from the transmission for emptying of the fluid therefrom and replacement of the pan on the transmission housing. This can prove to be a messy and time consuming process. In addition, the pan is often not replaced squarely over the pan seal or, on occasion, will trap small foreign obstacles in the seal area resulting in leakage.

More recently, there have been efforts to make a complete exchange of all the fluid in an automobile's transmission by disconnecting a fluid tube and draining the fluid into a waste oil dump while manually pouring new fluid into the transmission dipstick tube. This procedure has proven to be inefficient, inadequate and so time consuming that it has failed to gain broad acceptance.

Another method proposed involves disconnecting a transmission fluid cooler line to allow one disconnected end to drain freely, while the other end is connected to a relatively large pressurized bulk storage tank to inject unused fluid into the cooler line to refill the transmission. This procedure can be quite untidy and has proven to be generally unsatisfactory. One major disadvantage associated with this method is that, in many instances, it is difficult to match the rate fluid is withdrawn from the transmission with the rate of refill due to the various internal resistances offered by the different models of transmissions to be serviced. As such, there is a risk that the fluid level in the transmission will drop dangerously low resulting in possible cavitation of the transmission pump as well as damage to the fluid seals, rear bearings and other internal components of the transmission. This difficulty is compounded by the fact that the flow resistance through the transmission varies with the different models of transmissions.

Yet another device proposed in an attempt to facilitate fluid removal and replacement in an automobile fluid system includes a switching control device permanently mounted to an engine oil system. A device of this type is described in U.S. Pat. No. 5,056,621 to Trevino. This device includes a pump to be mounted to the engine block and a pair of input suction conduits for connection to, respectively, an oil drain port and to a source of unused oil. The device includes a switch which allows for the selection of the conduit through which fluid will be drawn and a pump to draw fluid through the selected conduit. An output conduit is also provided with a free distal end for releasable connection to a waste oil tank when the switch is in the position to flow fluid from the oil drain port, and for releasable connection to an oil filler tube when the switch is placed in the position to allow fluid to flow from the source of unused fluid. Thus, devices of this type have not gained acceptance for changing transmission fluid in that they do not provide for the simultaneous exchange of fluid, are burdensome to use and time consuming because, in order to switch such a device between withdrawing and replacing fluid, the operator must manually remove the output conduit from the waste oil tank and connect such conduit to the vehicle's oil filler tube.

Other work in this field has led to the proposal of a transmission fluid changer including air pressurized tanks for the delivery and extraction of transmission fluid via the transmission cooler lines. A device of this type is shown in U.S. Pat. No. 5,318,080 to Viken. Such devices are rather cumbersome, require connection with a pressure hose which ends up acting as an umbilical cord thus committing such cord on a dedicated basis rendering it generally unavailable to perform other tasks and restricting the degree to which the device may be manipulated in use. Such devices have not gained acceptance in the marketplace.

Further efforts have led to a portable device which may perform a simultaneous, substantially complete exchange of transmission fluid. Such a device is shown in U.S. Pat. No. 5,370,160 to Parker who granted the rights therein to the assignee of the rights in the present invention. Such a device may be utilized to adjust flow rates of the fluids being withdrawn from and introduced to the transmission. This device, while having gained acceptance in the field, suffers the shortcoming that it is bulky, occupies a substantial amount of floor space during use and is somewhat expensive to manufacture.

Still further efforts have led to the development of a portable device which could be used to perform an exchange of transmission fluid. Such a device is shown in U.S. Pat. No. 5,337,708 to Chen. This device suffers some of the same shortcoming as does the device in U.S. Pat. No. 5,370,160, in that it is relatively massive and occupies a substantial amount of floor space during use and suffers the further drawback that, in normal operation, the process of making the exchange using this device is quite time consuming.

Efforts have been made in other areas to devise a method of exchanging fluid without the use of a wheeled cart. In the exchange of motor oil it has been proposed to employ a drain hose wound on a retractable reel and connected on its free end to a drain funnel for placement beneath the vehicle oil pan drain opening for withdrawal of oil by gravity into such funnel. Such a device is shown in U.S. Pat. No. 3,140,756 to Dinkelkamp. A suction pump connected to the drain hose serves to flow such withdrawn oil to a remote waste oil tank. This device contemplates that the operator will completely drain the used oil from the engine, replace the drain plug, and manually refill the engine with unused fluid. This apparatus has not gained acceptance in that it fails to provide for simultaneous exchange of fluid and requires that the operator manually refill the crankcase.

In my parent patent application, U.S. Ser. No. 08/403,180, filed Mar. 13, 1995, and now U.S. Pat. No. 5,535,849, I disclosed the basic concept of a hand held transmission fluid exchanger. While serving to solve many of the existing problems with exchanging transmission fluid, there still remains the need for a hand held exchanger which will automatically balance the flow rate of unused fluid introduced to the transmission with the flow rate of used fluid withdrawn therefrom and which will preferably tally the quantity of fluid dispensed.

As such, it may be appreciated that there continues to be a need for an automatic transmission fluid exchanging device which is so compact it could be held in a user's hand but yet being operative to automatically replace substantially all the used fluid in an automatic transmission while posing minimum risk to the transmission. The instant invention addresses such needs.

SUMMARY OF THE INVENTION

Briefly, and in general terms, the present invention is in the form of a lightweight, automatic hand held transmission fluid changer comprising a relatively compact housing internally plumbed with a pair of supply and drain tubes having respective inlet and outlet couplings attached thereto. Hoses defining supply and drain hoses leading, respectively, from a remote bulk supply drum and to a remote bulk waste drum may be connected to the respective supply inlet coupling and drain outlet coupling. When the automatic hand held transmission fluid changer is to be used, the drain inlet and supply outlet couplings of the automatic hand held transmission fluid changer may be releasably connected to a pair of tubes leading, respectively, from a disconnected transmission fluid cooler line and to a cooler port on the vehicle radiator to which the fluid cooler line is normally connected. A demand pump serves to flow unused fluid from the remote bulk supply drum through the supply hose to the supply tube. The transmission fluid pump is conveniently utilized to pump used fluid through the disconnected cooler line to the drain tube. The automatic hand held transmission fluid changer further includes an electrical flow control valve in the supply tube. Flow control circuitry is responsive to the flow rate in the drain tube via an electric flow meter housed in such tube to manipulate the electrical flow control valve so as to balance the flow rates through the respective drain and supply tubes.

DESCRIPTION OF THE DRAWINGS

FIG. 6 is a schematic diagram of certain components included in a second embodiment of the present invention.

DETAILED DESCRIPTION OF THE PREFERRED EMBODIMENT

Figure 1:
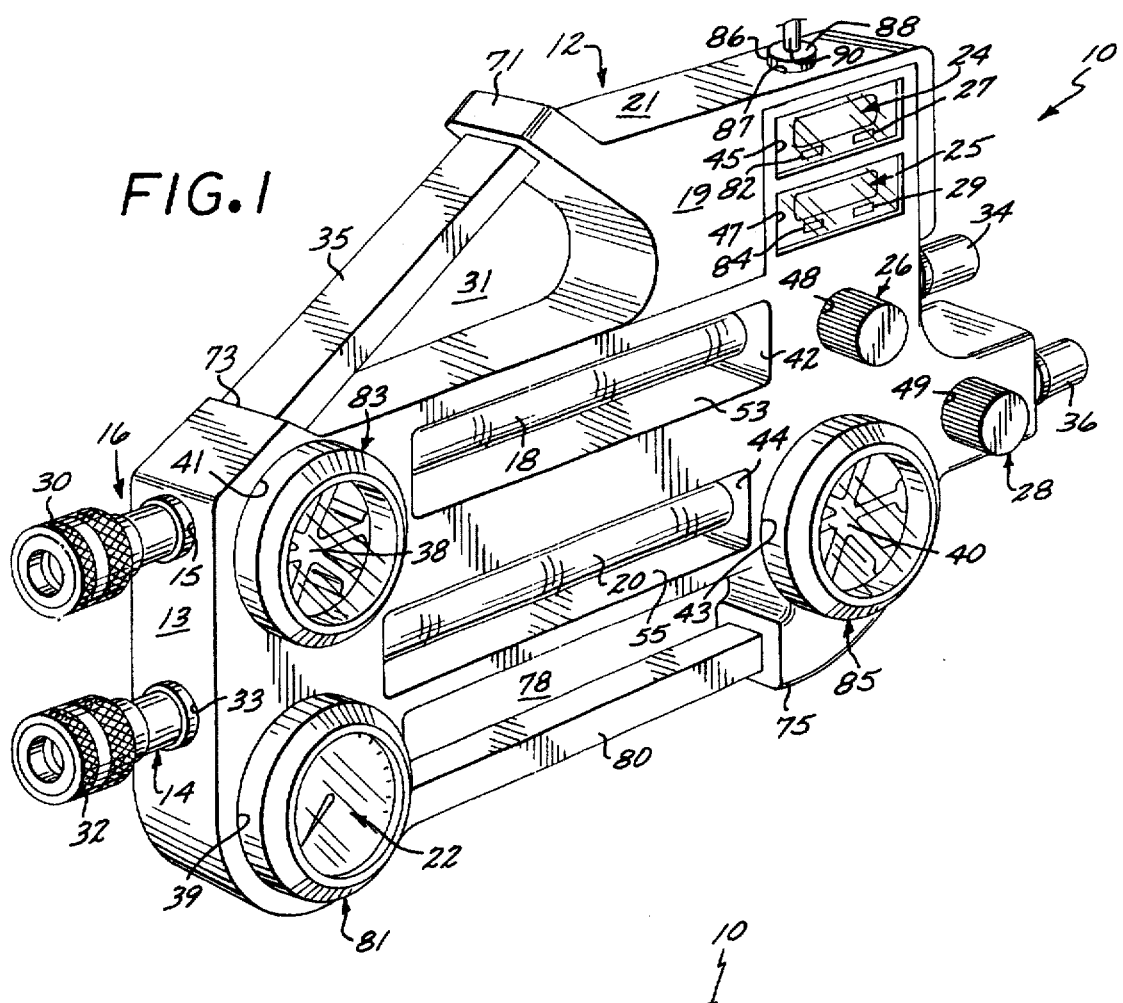
FIG. 1 is a perspective view of a hand held transmission fluid changer embodying certain elements of the present invention.
Figure 2:
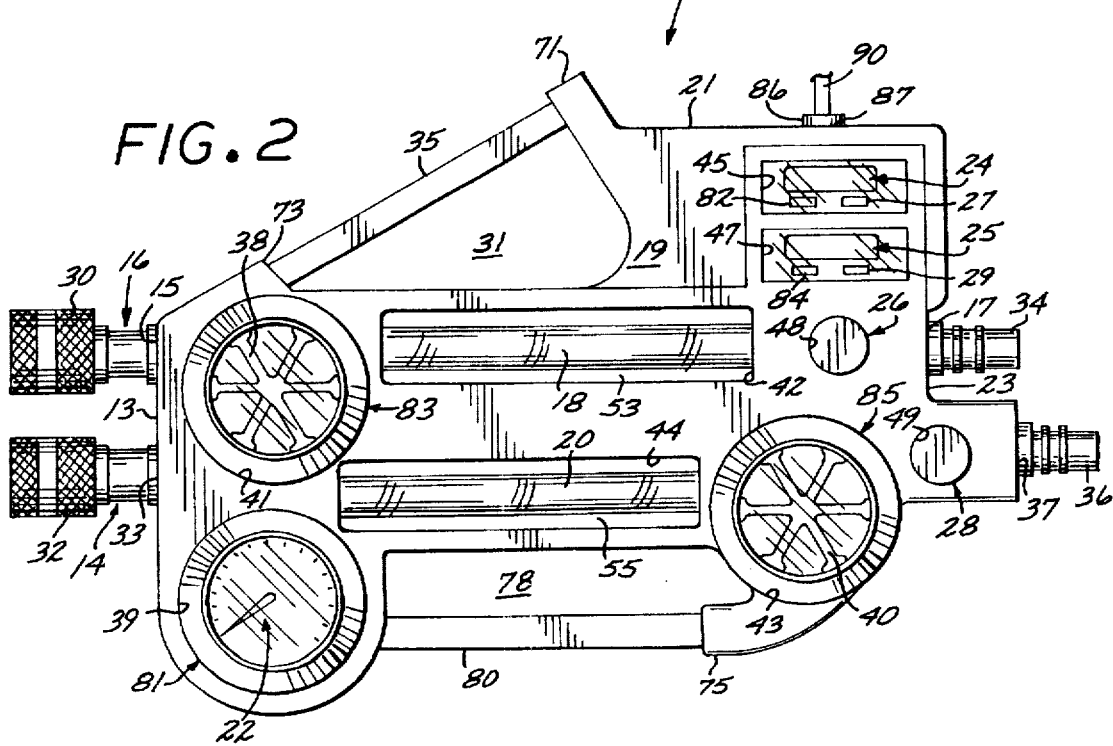
FIG. 2 is a front view, in reduced scale, of the hand held transmission fluid changer shown in FIG. 1.

In the following detailed description, like reference numerals will be used to refer to like or corresponding elements in the different figures of the drawings. Referring now to the drawings, and particularly to FIGS. 1 and 2, there is shown, generally, a hand held transmission fluid changer 10 of the type disclosed in my earlier patent application Ser. No. 08/403,180, filed Mar. 13, 1995, and now U.S. Pat. No. 5,535,489, which will be described herein because it embodies certain aspects of the present invention. The hand held transmission fluid changer 10 comprises, generally, a lightweight housing 12 housing a pair of internal fluid passageways defined by, respectively, drain and supply tubes 14 and 16. The tubes terminate at their respective ends in oppositely disposed male and female quick disconnect couplings 30, 32, 34 and 36 which project longitudinally outwardly from the opposite end walls 13 and 23 of the housing 12, thus allowing for external access to the respective tubes. The drain and supply tubes further include respective translucent sight glasses 18 and 20 for observation of the color of the fluids flowing in the respective fluid tubes. A pair of flow control valves depicted in my earlier application as including respective control knobs, generally designated 26 and 28, are incorporated in the respective tubes to provide for manipulation of the flow rates through such tubes. As will be described hereinbelow in conjunction with FIG. 4, these manual flow control valves are replaced in the present invention by an electrically powered control valve controlled by a micro-chip circuit which serves to automatically balance the in-and-out flow rates.

With continued reference to FIGS. 1 and 2, a pair of digital display devices, generally designated 24 and 25, are mounted on the front wall 19 of the housing 12 for viewing thereof and are connected to and manipulated by a pair of flow meters 38 and 40 disposed in the respective tubes 14 and 16, such that the quantities of fluid flowed through the respective tubes are determined and displayed to the operator.

Automatic transmissions typically include transmission fluid lines external to the transmission itself, such as transmission fluid cooler lines which extend between the transmission and the vehicle's radiator for the transmittal of such fluid to the radiator for the cooling and return thereof to the transmission. The transmission includes an internal transmission pump which flows heated fluid in the transmission through one of such cooler lines to the radiator where it is cooled and returned to the transmission via the other cooler line. As recognized in my earlier patent application and shown in FIG. 5, one of these external cooler lines 69 may be disconnected to define an accessible fluid port downstream of the transmission fluid pump for removal of used fluid to a remote bulk waste drum 54. The exposed radiator port 63, to which the cooler line normally connects, is then utilized to define an accessible fluid port upstream of the transmission fluid pump for receipt of unused fluid from a remote bulk supply drum 56. When the transmission fluid pump is thereafter actuated, used fluid will be pumped from the downstream fluid port through a drain line 72 to a disposal line 51. A fresh fluid line 74 may be connected to the upstream fluid port and unused fluid pumped from the supply drum for the simultaneous introduction of unused fluid to the transmission. The present invention provides a compact device which may be normally stored in an elevated suspended position for convenient grasping to be drawn into position for connection to such fluid ports to efficiently perform a simultaneous, complete exchange of fluid.

The housing 12 is constructed of metal or hard plastic and is about 6"×10" in front view, and 2" deep. The housing 12 is, in front view, constructed with a generally rectangular configuration to define the oppositely disposed end walls 13 and 23, longitudinally extending, side-by-side through window slots 42 and 44 over which respective lenses 53 and 55 are mounted for viewing of the respective sight glasses 18 and 20.

Referring to FIG. 2, the housing 12 is formed at its right hand end with an upstanding rectangular display panel 21 having a handle mounting flange 71 angling upwardly to the left to mount one end of a rectangular hand grasp rail 35 which angles downwardly to the left at an angle of about 20 degrees to the longitudinal axis of the housing to be mounted at its left end to a mounting flange 73. The housing is formed opposite such rail with an acute angle, curved cut out to cooperate with such rail in forming a triangular hand-hold opening 31. Such housing is formed at its bottom side with a longitudinally projecting stub fitting 75 which mounts one end of a longitudinally projecting hand grasp rail 80 spaced downwardly from the bottom wall of the housing to cooperate therewith in forming a rectangular hand grasp opening 78.

The front wall 19 of the housing 12 is formed at its left hand end (FIG. 2) with a pair of circular openings 39 and 41, and at its right hand end with a circular opening 43 for alignment with, respectively, the pressure gauge 22 and flow meters 38 and 40.

Formed in the front wall of the display panel 21 are a pair of parallel, longitudinally extending, laterally spaced apart rectangular slots 45 and 47 defining windows aligned with the respective display devices 24 and 25. Further, a pair of bores 48 and 49 are formed on the front wall adjacent one longitudinal end 23 of the housing 12 for projection therethrough of the respective control knobs of the flow control valves 26 and 28 included in the hand held transmission fluid changer disclosed in my earlier patent application.

A plurality of bores 15, 17, 33 and 37 are formed on the respective end walls 13 and 23 (FIGS. 1 and 2), such bores serving to project the respective quick disconnect couplings 30, 32, 34, and 36 therefrom as described in more detail below.

The housing 12 and housed components have a combined weight of about five pounds and preferably no greater than twenty pounds for convenient suspension from the overhead reel and manipulation about during use.

The supply tube 16 includes, in series, the sight glass 18, the flow meter 38 and the flow control valve 26 (FIGS. 1 and 2). The supply tube terminates at one end in the supply inlet male quick disconnect coupling 34 which projects through the bore 17 formed on the end wall 23 and terminates at its opposite end in the supply outlet female quick disconnect coupling 30 which projects through the bore 15 formed on the opposite end wall 13. The supply inlet may be conveniently accessed by a supply hose to flow unused fluid into the supply tube while the supply outlet may be accessed by an unused fluid hose to flow such unused fluid to a downstream transmission fluid port as described in greater detail below.

The drain tube 14 includes, in series, the sight glass 20, the drain flow control valve 28, the flow meter 40 and a pressure sensor and gauge 22 (FIGS. 1 and 2). The drain tube terminates at one end in the drain outlet male quick disconnect coupling 36 which projects through the bore 37 formed on the end wall 23 and terminates at its opposite end in the drain inlet female quick disconnect coupling 32 which projects though the bore 33 formed on the opposite end wall 13. Thus, the drain inlet may be accessed by a used fluid hose for conducting used fluid withdrawn from an upstream transmission fluid port to the drain tube while the drain outlet may be accessed by a drain hose for conducting used fluid from the drain tube to a remote bulk waste drum as described in more detail below.

The couplings 30 and 32 are embodied as female quick disconnect couplings and the couplings 34 and 36 as male quick disconnect couplings. It will be appreciated that the couplings may assume many forms, such as male or female quick disconnects, bayonet mounts, threaded mounts, compression fittings and the like.

The sight glasses 18 and 20 comprise open ended, translucent tubes thus providing for the visual inspection of the fluid flowing through the drain and supply tubes 14 and 16 (FIGS. 1 and 2). The operator may visually observe the color of the fluid being withdrawn from the transmission as it flows through the drain sight glass 20, so that it may be determined when the fluid being withdrawn from the transmission attains substantially the same color as unused transmission fluid thus providing an indication that there has been a full fluid exchange. In this regard, it will be appreciated that, initially, the fluid flowing through the drain sight glass 20 as the exchange is commenced will typically have a brown tint as is characteristic of used transmission fluid. When a quantity of unused fluid has been pumped into the transmission to substantially displace the entire quantity of used fluid, the color of the fluid flowing through the drain sight glass 20 will attain a red tint as is characteristic of many types of unused transmission fluid, thereby indicating substantially full displacement of the used fluid. It will be appreciated by those skilled in the art that this color change will occur when the quantity of unused fluid pumped into the transmission approaches 100% to 125% of the fluid capacity of the transmission.

The pressure sensor 22 senses fluid pressure in the drain tube 14 as generated by the vehicle transmission pump and communicates the pressure reading to the pressure gauge for display thereof to the operator (FIGS. 1 and 2). The operator may then compare the pressure gauge reading (in psi) with the normal operating range of the transmission fluid pump specified in the owner's manual or the like to obtain an indication of the condition of the transmission itself.

The flow meters 38 and 40 are in the form of rotary vane meters. It will be appreciated that the flow meters could take many different forms, such as propeller or turbine flow meters and the like.

The digital displays 24 and 25 are electrically connected to the flow meters 38 and 40 for communication therebetween of information in the form of electrical signals regarding the respective rates of fluid flow in the respective tubes 14 and 16. The displays include output select buttons 82 and 84 which allow for selecting the form of output displayed by the respective display devices. The respective displays are designed for selectively displaying the flow rates through the respective tubes, in quarts or liters per hour, and the respective total amounts flowed through such tubes during that particular service, during some elapsed time period, or during the entire service life of the fluid changing apparatus, in either quarts or liters (FIG. 2).

Thus, the digital displays 24 and 25 enable the operator to determine when the quantity of unused fluid delivered to the transmission matches or exceeds the capacity of the transmission. The operator may observe the total quantity of fluid delivered to the transmission by observing the unused fluid display device and may determine when the fluid exchange process has been substantially completed by comparing that amount with the total fluid capacity of the transmission itself. When it is determined that the amount of fluid delivered to the transmission equals or exceeds by some set figure the fluid capacity of the transmission, the operator will know that substantially all the used transmission fluid has been replaced and may discontinue the fluid exchange process. It will be appreciated that initially the unused fluid delivered to the transmission will mix with and be somewhat contaminated by used fluid still stored within the transmission. Thus, in order to perform a substantially complete flush of the used fluid in a transmission, it is necessary to introduce a quantity of unused fluid exceeding the specified capacity of the transmission to be assured that the volume of fluid remaining in the transmission has been substantially totally exchanged. The flow meters 38 and 40 and digital displays 24 and 25 provide an indication of progress in this regard and afford an indication of the actual quantity of unused fluid consumed for billing purposes and the like.

It will be appreciated that the digital displays 24 and 25 could be replaced with conventional mechanical counters driven by the respective flow meters 38 and 40 for displaying the total amounts of fluid flowed through the drain and supply tubes 14 and 16.

The respective display devices 24 and 25 further include reset buttons 27 and 29 (FIGS. 1 and 2) which allow for selectively resetting the counters of the displays, such as before initiating a fluid exchange procedure.

Referring to FIGS. 1 and 2, the digital displays 24 and 25 and flow meters 38 and 40 are electrically actuated and thus require electrical power to operate. Thus an outlet 86 is included and projects outwardly from a lateral wall of the housing 12 through a bore 87 formed thereon for receiving a plug 88 of a power cord 90 which connects at its other end to a 12 Volt DC power source (not shown) such as the battery of the automobile being serviced. The outlet includes electric leads (not shown) connected in parallel to the digital displays and the flow meters for transmitting electrical power delivered by the power cord to such components.

Figure 3:
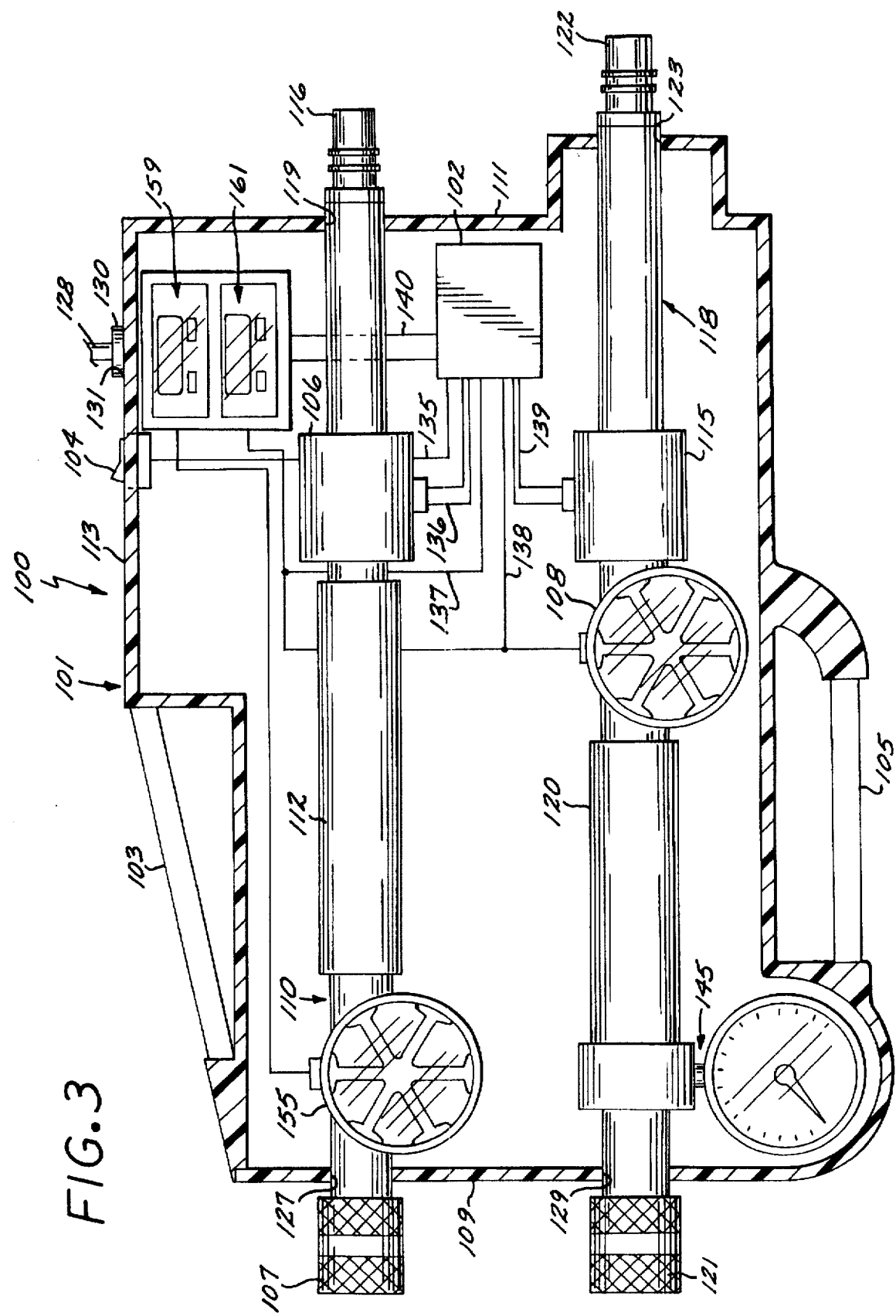
FIG. 3 is a front sectional view of the preferred embodiment of the automatic hand held transmission fluid changer of the present invention.

Referring to FIG. 3, there is shown the internal components included in the automatic hand held transmission fluid changer of the present invention. The changer, generally designated 100, is similar to the changer 10 shown in FIGS. 1 and 2 but includes, generally, in place of the manual flow control valves 26 and 28 included in the embodiment disclosed in my earlier application and shown in FIGS. 1 and 2, control circuitry 102 embodied in the preferred embodiment as a series ratemeter/totalizer microprocessor chip such as Model No. DP-F30 manufactured by Omega Manufacturing of Stanford, Conn. Other suitable logic devices are available, such as programmable controllers from Allen Bradley of Milwaukee, Wis. or from General Electric. The ratemeter/totalizer is formed with a plurality of ports for electrical connection to, respectively, an on-off switch having a toggle rocker 104, a power cord 128, first and second flow meters 108 and 155, an on-off solenoid valve 115, and an electrically actuated control valve 106 having an electrical operator by means of respective electrical leads 135 through 140.

A drain tube assembly, generally designated 118, is housed in the housing 101 and includes, in series, the flow meter 108, a sight glass 120, the solenoid valve 115, and a pressure sensor and gauge, generally designated 145. The drain tube terminates at one end in a female quick disconnect coupling 121 which extends through a bore 129 formed on one longitudinal end 109 of the housing. The other end of the drain tube terminates in a male quick disconnect coupling 122 which projects outwardly from the opposite longitudinal end 111 through a bore 123 formed on such end.

The flow meter 108 is electrically connected to, for communication with, a digital display device, generally designated 161, including an output select button 162 and a reset button 163, identical to the display devices 24 and 25 described above. Thus, the operator may select the desired output of the display, either in terms of the flow rate or total volume flowed through the drain tube 118.

A supply tube assembly, generally designated 110, is also housed in the housing 101 and includes, in series, a second flow meter 155, a second sight glass 112, and the electrically actuated control valve 106. The supply tube terminates at one end in a female quick disconnect coupling 107 which extends through a bore 127 formed on the end 109, and terminates at the opposite end in a male quick disconnect coupling 116 which projects outwardly from the end 111 through a bore 119 formed thereon.

The second flow meter 155 is electrically connected to a second display device, generally designated 159, which likewise includes a select button 164 and reset button 165 and may display either the total volume of unused fluid flowed through the supply tube 110 or the flow rate through such tube, typically in liters or quarts.

Figure 4:
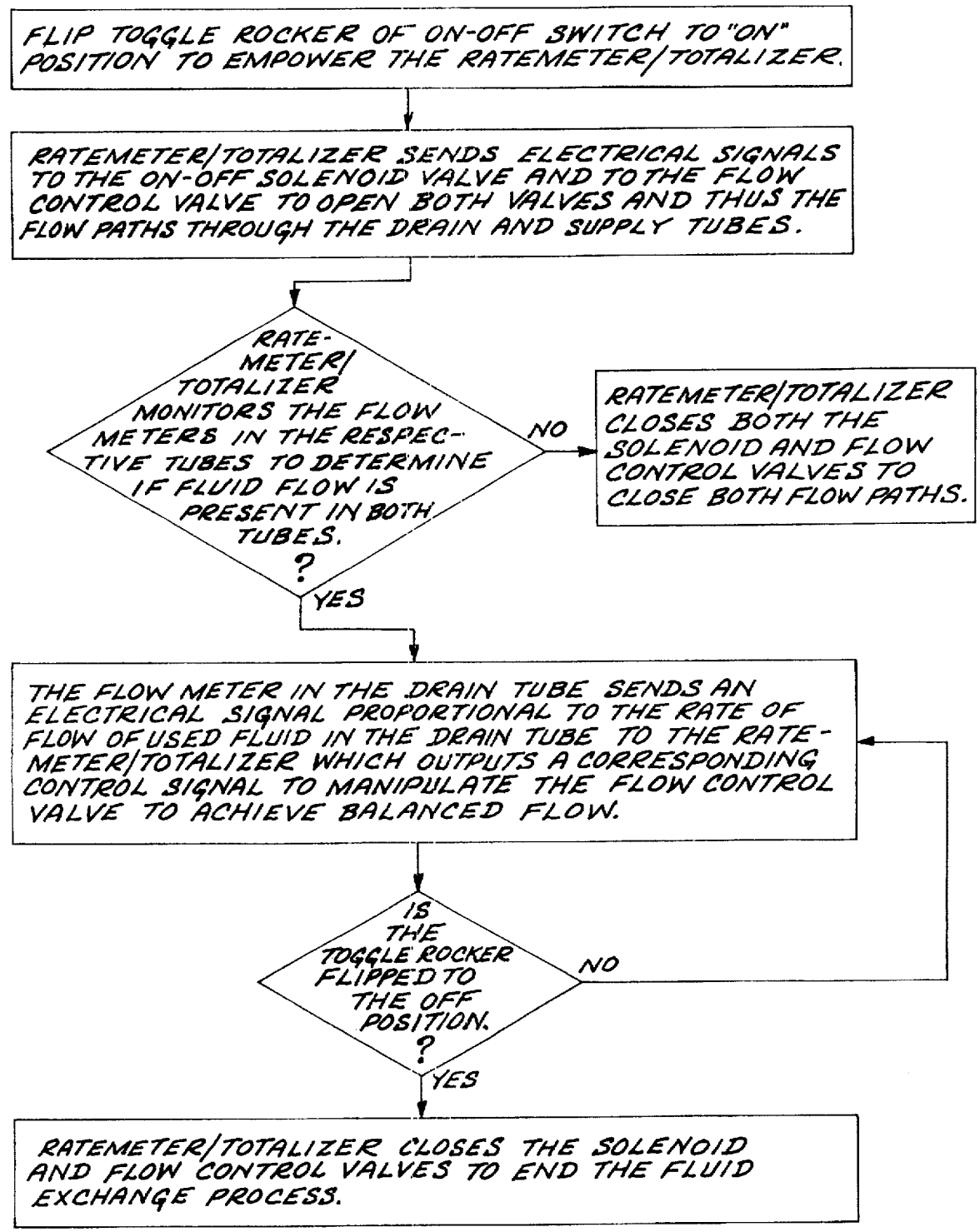
FIG. 4 is a flow chart illustrating the operation of a control chip included in the automatic hand held transmission fluid changer shown in FIG. 4.

Referring to FIG. 4, a flow diagram is provided depicting the operational steps of the ratemeter/totalizer microprocessor chip 102. The toggle rocker 104 is initially flipped to its "ON" position, thereby actuating the ratemeter/totalizer. When the ratemeter/totalizer is actuated, it transmits respective electrical signals to the solenoid valve 115 and to the control valve 106 to open both such valves and thus the flow paths through the drain and supply tubes 110 and 118. The ratemeter/totalizer then monitors the drain and supply tubes for an indication of fluid flow in both such tubes. Sensors sense fluid in the respective drain and supply tubes and are connected through a capacitor circuit to, upon sensing the absence of fluid flow therein for a period of five seconds, generate a shut down electrical signal to be communicated to both the solenoid valve and flow control valve, thereby closing both such valves and thus the flow paths through the drain and supply tubes.

If fluid flow is detected in both the drain and supply tubes 110 and 118, the ratemeter/totalizer 102 then receives and processes an electrical signal from the flow meter 108, such signal being proportional to the rate of used fluid flow through the drain tube. The ratemeter/totalizer then outputs a corresponding electrical control signal for manipulating the control valve 106 in the supply tube a selected amount to adjust flow in the supply tube and thereby match the rate of flow in such tube with the rate in the drain tube as created by the transmission pump.

The external power cord 128 includes a plug (not shown) and may be releasably plugged into a socket formed in the end of an electrical fitting 130 projecting through a bore 131 formed on a lateral wall 113 of the housing 101 to distribute electrical power to the electrically activated elements of the automatic hand held transmission fluid changer. In practice, the changer 100 may include a 12 volt rechargeable power source in place of the power cord.

The fluid changer of the present invention may also be provided with a number of input buttons (not shown) to allow the operator to select the quantity of fluid to be exchanged. For example, jog in and jog out buttons may be provided to add or remove additional fluid, such as after a fluid exchange procedure has been completed and where the fluid level in the transmission is either slightly below or above the full level for that particular transmission. The operator may then push one of the buttons to generate a corresponding signal to be transmitted to the ratemeter/totalizer 102 which outputs a control signal to open either the drain fluid path or the supply fluid path to either add or remove fluid, depending on which button is depressed.

In addition, a preset quantity button may be provided to allow for selecting a preset quantity of fluid to be exchanged. The ratemeter/totalizer 102 will then monitor the amount of fluid changed and automatically shut the flow off when the preselected amount of fluid exchanged is sensed.

A manual batch button may also be included to allow the operator to select any quantity of fluid to be exchanged. As with selecting an amount by pressing the preset batch button, the ratemeter/totalizer 102 will count the volume transferred and automatically close both the drain fluid path as well as the supply fluid path when the preselected amount of fluid has been exchanged.

Figure 5:
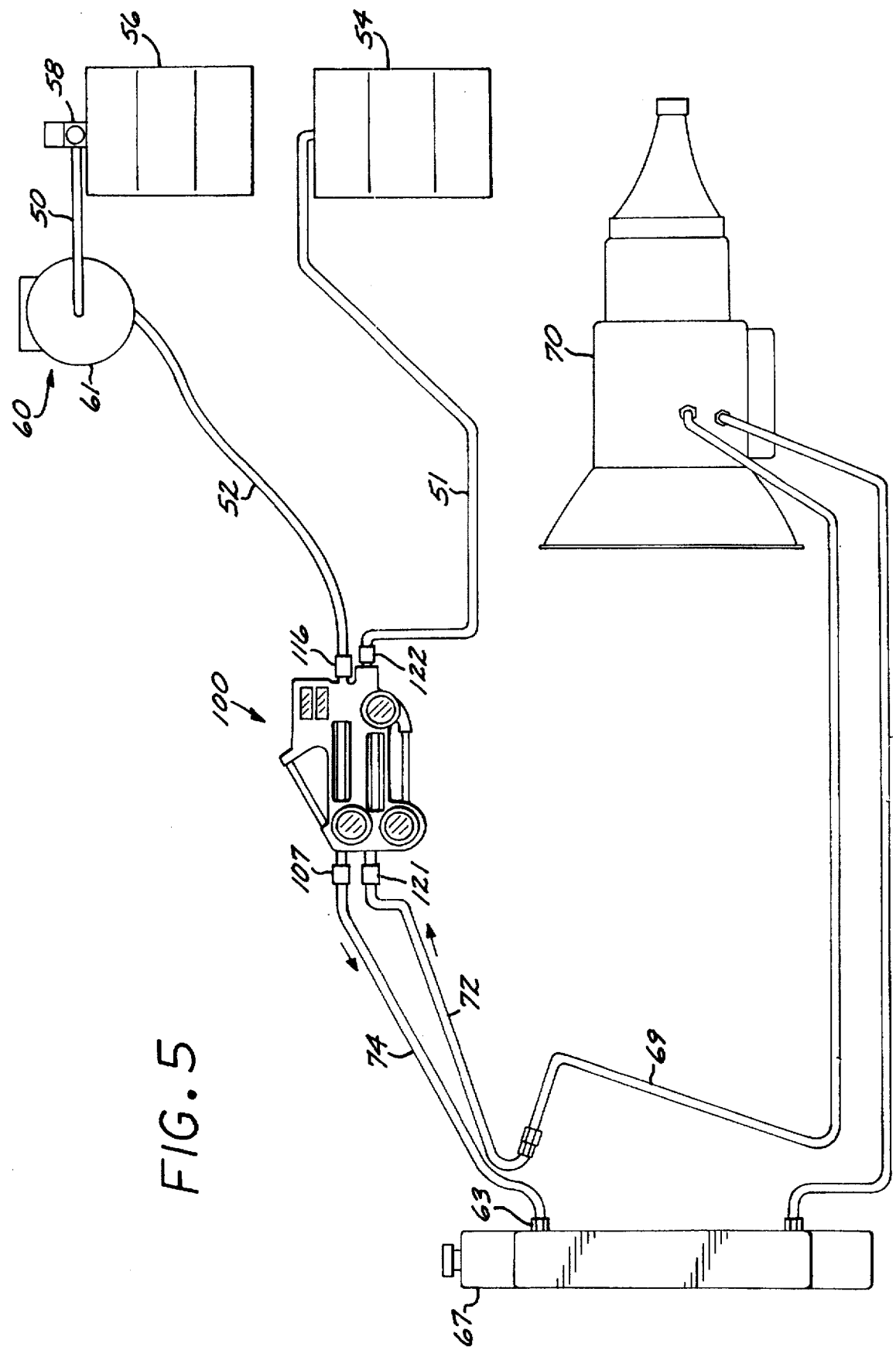
FIG. 5 is a schematic diagram of the automatic hand held transmission fluid changer of the present invention with respective hoses appropriately connected thereto for performing a transmission fluid exchange.

Referring to FIG. 5, the automatic hand held transmission fluid changer 100 may be connected at the supply inlet coupling 116 to a conventional supply hose 52, which serves to conduct fluid between a remote bulk supply drum 56 and the supply tube 110. The supply hose is typically connected for fluid communication with a conventional bulk supply conduit 50 connected in series with a single or double piston, 60 psi demand pump 58 typically employed to pump fluid from the bulk supply drum through such supply conduit. A double piston pump is preferably employed to provide smoother operation during the fluid exchange process. A pressure sensor (not shown) is included in the supply conduit and is responsive to the pressures sensed in the supply conduit to, upon such pressure dropping below, for instance, 60 psi, generate a control signal to actuate the supply pump. In the preferred embodiment, the supply hose 52 is wound on, and may be extended from, a conventional overhead reel assembly, generally designated 60, which is preferably fixedly attached to the ceiling of the service bay or the like. The reel assembly includes a conventional, internally biased spool 61 operative upon manipulation thereof to wind a portion of the supply hose thereon. Thus during periods of non-use the supply hose serves to suspend the automatic hand held transmission fluid changer elevated to a preselected height above the floor in an out of the way manner. The reel 60 includes a conventional fluid rotary connector (not shown) to transition from the bulk supply conduit 50 to the supply hose 52.

With further reference to FIG. 5, the automatic hand held transmission fluid changer 100 is normally suspended on the hose 52 from the reel 60 in an overhead retracted position and may be manually maneuvered into a more accessible position for use by grasping and manipulating such changer about to draw the hose 52 from such reel. When a fluid exchange procedure is to be performed, the operator may grasp the housing 100 and draw the hose 52 downwardly and grasp the handle 103 with his or her left hand. The operator will then couple the drain hose 51 at one end with the drain outlet coupling 122, the hose being connected at its opposite end to the remote bulk waste drum 54 thus serving to conduct used fluid from the drain tube 118 to the bulk waste drum.

With further reference to FIG. 5, the used fluid hose 72 connects on one end to the drain inlet coupling 121 and on the opposite end to a downstream transmission component downstream of the transmission pump, such as the disconnected transmission cooler line 69, for the withdrawal of used fluid therefrom as described above. An unused fluid hose 74 is connected at one end to the supply outlet coupling 107 and at its opposite end to a fluid port upstream of the transmission pump, such as the cooler line port 63 on a vehicle radiator 67, for delivering unused fluid thereto as described above. Thus with the respective hoses connected as such a simultaneous transmission fluid exchange may be performed as described in more detail below.

It will be appreciated by those skilled in the art that different automobile manufacturers design their respective automobiles differently. As such, the factory cooler lines and radiator ports for various automobiles are formed differently and thus have differently configured end couplings. Thus, a plurality of varyingly configured used and unused fluid hoses 72 and 74 may be provided which include uniformly configured first ends for mating with the quick disconnect couplings 107 and 121 and which will be formed with varyingly configured second ends for mating with correspondingly configured end couplings of the various cooler lines and radiator ports of different automobiles. By way of example, the respective second ends of the fluid lines may be formed with threaded end fittings of varying sizes, with straight male fittings of varying sizes, with female fittings of varying sizes, or with variously configured compression fittings for mating with the respective cooler lines and radiator ports of different automobiles. In another embodiment, universal couplers are provided which include radially expandable nipples which are compressed longitudinally to flex radially outwardly in ports of different sizes to sealingly engage the respective interior walls of differently sized ports.

The automatic hand held transmission fluid changer 100 of the present invention is intended to be used with different models of automobiles and thus with different transmissions so it will encounter different rates of flow as dictated by the flow characteristics of different flow paths and different transmission pumps. In addition, different transmissions will present different internal flow resistances as determined by the internal components within such transmissions. Thus the electric control valve 106 and ratemeter/totalizer 102 are provided to match the respective rates of flow through the drain and supply tubes 110 and 118 so that the automatic hand held transmission fluid changer 100 may be used to service different transmissions having various flow and resistance characteristics. In my earlier patent application I disclosed such flow control valves as manually operated valves including respective control knobs projecting through the bores 48 and 49 formed in the front wall 19 (FIG. 1) to be manipulated manually. As such the respective flow control valves may be externally manipulated by an operator to either increase or decrease the rate at which fluid is withdrawn from or injected into the transmission. Thus by using either the automatic version of the present invention disclosed herein or the manual version disclosed in my earlier patent application, the respective flow rates through the drain and supply tubes may be precisely matched, regardless of the source pressure from the fluid supply, the internal flow resistance within a particular automatic transmission and likewise regardless of the particular transmission fluid pump in the transmission being serviced.

In use, the automatic hand held transmission fluid changer 100 may be conveniently stored during service operations such that it does not interfere with the available work area in a service bay or the like. When the automatic hand held transmission fluid changer is to be used, the operator may simply grasp the housing 101 by one or both of the handles 103 and 105 and pull such changer downwardly, resulting in the application of an external force to the reel 60 which serves to rotate the spool 61, thereby paying out the supply hose 52 as the operator maneuvers the changer into position for efficient use thereof. The operator may then connect the free end of the drain hose 51 to the drain outlet coupling 122 and connect the respective first ends of the appropriate unused and used fluid hoses 72 and 74, with the appropriately configured opposite end couplings, to the drain inlet coupling 121 and supply outlet coupling 107, and connect the respective opposite ends of such hoses to the correspondingly configured cooler line 69 and radiator port 63 of the transmission to be serviced.

The operator may then start the vehicle engine, resulting in the operation of the transmission fluid pump and thus initiation of fluid flow through the transmission fluid circuit. Such fluid will be directed through the disconnected cooler line 69 into the used fluid hose 72 for conduction thereof through the drain inlet coupling 121 into to the drain tube 118. The fluid in the drain tube will flow through the drain sight glass 120 where the operator may inspect the color of such fluid. The pressure generated by the particular pump of the transmission being serviced is sensed by the pressure sensor 145 and displayed by the pressure gauge. The used fluid will then be flowed through the drain outlet coupling 122 and the drain hose 51 for storage thereof in the bulk waste drum 54.

The operator may, simultaneous with the activation of the transmission fluid pump, actuate the demand pump 58 and flip the toggle rocker 104 to the "ON" position, resulting in the flow of unused fluid through the supply conduit 50 and supply hose 52 and into the supply tube 110. Such unused fluid will flow through the supply sight glass 112 and out the supply tube through the unused fluid hose 74 into the downstream port 63 of the transmission fluid circuit, thereby performing a simultaneous exchange of transmission fluid in the transmission.

During the exchange process, the flow meters 108 and 155 sense the rate of fluid flow through the respective tubes and communicate such information in the form of corresponding electrical signals to the display devices 159 and 161 for display thereof to the operator, either in terms of flow rates or total amounts as preselected by the operator.

In addition, the electrical signal communicated by the drain flow meter 108 regarding the flow rate through the drain tube 118 is received and processed by the ratemeter/totalizer 102. The ratemeter/totalizer then outputs a corresponding control signal communicated to the electrical operator of the control valve 106, such control signal serving to manipulate the valve to a degree dictated by the signal from the flow meter. As a result, the flow rate through the supply tube 110 is automatically adjusted to match the flow rate through the drain tube. Thus, the ratemeter/totalizer acts to automatically balance the in-and-out flow rates to and from the transmission during the exchange process so that, at all times, the transmission has stored therein a sufficient amount of transmission fluid. The operator is thereby freed to perform other tasks after the exchange process is initiated while the flow rates are automatically balanced.

When it is determined that the fluid exchange process has been completed, by either observing the respective colors of the fluids flowing through the respective sight glasses 112 and 120, or by observing the quantity of unused fluid delivered to the transmission as measured by the flow meter 155 and displayed by the display device 159, the operator may flip the toggle rocker 104 to the "OFF" position thereby closing the solenoid valve 115 and control valve 106 to thereby cease fluid flow through the drain and supply tubes 110 and 118. The used and unused fluid hoses 72 and 74 may then be disconnected from the respective upstream and downstream ports of the transmission fluid system and the drain hose 51 disconnected from the drain outlet coupling 122. The operator may then manipulate the automatic hand held transmission fluid changer to release a brake (not shown) in the reel 61 to cause it to retract the supply hose 52 about the reel thereby retracting the automatic hand held transmission fluid changer to its elevated stored position.

Referring to FIG. 6, there is shown certain components included in a second embodiment of the present invention. In the second embodiment a pressurized air supply 150 is provided in place of the demand pump 58 included in the first embodiment and is connected to a bulk unused fluid supply drum 152 via a pressurized air line, generally designated 154. An air solenoid valve 156 is disposed in the air line and is connected to a control console 158 including a two position pressure switch 160, such as a Director Jr. console manufactured by Rotunda, a division of Ford Motor Company. Thus when a fluid exchange service is to be performed, the operator may simply flip the pressure switch to the "ON" position to thereby open the solenoid valve. Pressurized air will then be delivered to the supply drum through the air line to force unused fluid from the drum through a supply line 162 to the supply inlet of the transmission fluid changer to allow for performing a transmission fluid exchange procedure as described hereinabove.

It will be appreciated that the components shown in FIG. 6 could be used with a transmission fluid changing apparatus embodied as either a hand held version or as a larger-sized unit. The apparatus could comprise a wheeled cart or the like which housed respective supply and drain tanks and included a pair of fluid hoses connected at first ends to the respective tanks and which extended from the housing for connection at respective opposite ends with the respective fluid ports of the vehicle to be serviced. The apparatus would include the respective flow meters, flow control valve, solenoid valve, microprocessor chip and other components included in the hand held version.

From the foregoing, it will be appreciated that the automatic hand held transmission fluid changer of the present invention is lightweight, compact and convenient to use and will perform a substantially complete, simultaneous exchange of transmission fluid and can conveniently be stored when not in use.

While several forms of the invention have been illustrated and described, it will also be apparent that various modifications can be made without departing from the spirit and scope of the invention. Accordingly, it is not intended that the invention be limited, except as by the appended claims.

What is claimed is:

1. In a transmission fluid changing system having a pressurized unused fluid supply hose, a disposal hose, an unused fluid hose, a used fluid hose, a supply tank and a drain tank, a portable, automatic hand held controller apparatus comprising:

a hand held, portable housing formed with oppositely disposed end walls, an interior compartment, a pair of exterior hand holds for being grasped by an operator to be carried thereby and manipulated about, and a pair of elongated, laterally spaced apart openings defining respective windows;

coextensive, rigid supply and drain tubes housed in said compartment and projecting at their respective opposite ends outwardly through the respective said end walls to project from said housing to form, at the respective opposite ends thereof, a supply tube inlet and outlet and a drain tube inlet and outlet;

respective supply inlet and outlet couplings at the respective said supply tube inlet and outlet and disposed exterior to the respective said end walls for connection, respectively, with said supply hose and said unused fluid hose;

respective drain inlet and outlet couplings at the respective said drain tube inlet and outlet and disposed exterior to said housing for connection, respectively, with said used fluid hose and said disposal hose;

respective drain and supply flow meters in the respective said drain and supply tubes for sensing the fluid flow rates through the respective said drain and supply tubes and generating respective electrical supply and drain flow signals corresponding to the respective flow rates;

a pair of display devices mounted on said housing and electrically connected to the respective said flow meters for displaying the flow rates through the respective said drain and supply tubes;

a pressure sensor and gauge mounted in said housing and connected to said drain tube for sensing and displaying the pressure in said drain tube;

a pair of sight glasses in the respective said drain and supply tubes and disposed in confronting relation with the respective said windows in said housing;

a control valve in said supply tube including an electrical operator; and a controller electrically coupled with said drain flow meter and said electrical operator and responsive to said electrical drain flow signal to control said control valve in said supply tube to maintain the flow rate therethrough substantially equal to the flow rate in said drain tube as sensed by said drain flow meter, whereby said housing may be grasped by said hand holds to be held by the operator and said supply inlet coupling connected to one end of said pressurized unused fluid supply hose and the other end of said pressurized unused fluid supply hose connected to said supply tank, said supply outlet coupling connected to one end of said unused fluid hose and the other end of said unused fluid hose connected to a first transmission fluid port, said drain inlet coupling connected to one end of said used fluid hose and the other end of said used fluid hose connected to a second transmission fluid port, and said drain outlet coupling connected to one end of said disposal hose and the other end of said disposal hose connected to said drain tank to flow unused fluid from said supply tank through said pressurized unused fluid supply hose, supply tube and unused fluid hose to said first transmission fluid port and flow used fluid from said second transmission fluid port through said used fluid hose, drain tube and disposal hose to said drain tank, while said controller receives said electrical flow signals from said drain flow meter and is responsive to said flow signals to manipulate said control valve accordingly to maintain substantially equal flow rates through said drain and supply tubes.

2. The controller apparatus of claim 1 for connection with an external power source including a power cord having a plug, said controller apparatus further including:

an electrical socket mounted on said housing, configured for releasable engagement with said plug, and including a plurality of electrical leads electrically connected to the respective said flow meters, display devices, control valve, and controller; and a switch mounted on said housing and electrically connected to said controller for selectively actuating said controller.

3. The controller apparatus of claim 1 further including:

an electric solenoid valve in said drain tube and including an electrical drain valve operator electrically connected to said controller and responsive to an electrical signal from said controller to close said drain tube.

4. The controller apparatus of claim 1 wherein:

said controller apparatus weighs less than 20 pounds.

5. The controller apparatus of claim 1 wherein:

said housing is configured, in top plan view, with a size of substantially 6"×10".

6. The controller apparatus of claim 1 wherein:

said controller comprises a microprocessor chip.

7. The controller apparatus of claim 1 wherein:

the respective said couplings are in the form of quick disconnect couplings.

* * * * *